United States Patent Office 3,553,917
Patented Jan. 12, 1971

3,553,917
DUAL PRESSURE VIEWPORT ASSEMBLY INCORPORATING TRAPPED GAS SELF-RELIEVING FEATURES
Bruce Calvin Gilman, Annandale, Va., assignor to Ocean Systems, Inc., New York, N.Y., a corporation of New York
Filed May 20, 1969, Ser. No. 826,126
Int. Cl. E06b 5/12, 7/23
U.S. Cl. 52—308                                  1 Claim

ABSTRACT OF THE DISCLOSURE

A novel viewport for use in pressure vessels characterized in that the windows are free to move in their support members so that trapped gas between the windows of the viewport can be released upon pressure reversal.

---

This invention relates to a viewport for use in pressure vessels subject to internal or external pressures exerted by fluids or gases or combinations thereof and more particularly to such viewports for use in manned submersible pressure vessels.

Viewports for submersible decompression chambers (SDC's) are characteristically made up of an external lens and an internal lens separated by a gap. These lenses were tightly compressed into their assemblies. While the vessel was in operation at the sea bottom, the gas in the chamber, usually a mixture containing a large percentage of helium would slowly permeate through the seals of the viewport assembly into the gap between the lenses. Upon decompression the helium would not have enough time to permeate out of the gap. Accordingly, when the pressure of the gas in the gap exceeded the external pressure on the lens the assembly would be destroyed or damaged by the lens being projected out of its seat in the assembly. This was not only costly in terms of damage to the vessel and equipment, but also extremely hazardous to personnel in or around the decompression chamber.

Accordingly, it is the main object of this invention to provide a dual pressure viewport incorporating means for relieving trapped gas.

This and other objects will become apparent from the following description and drawings.

Figure 1:
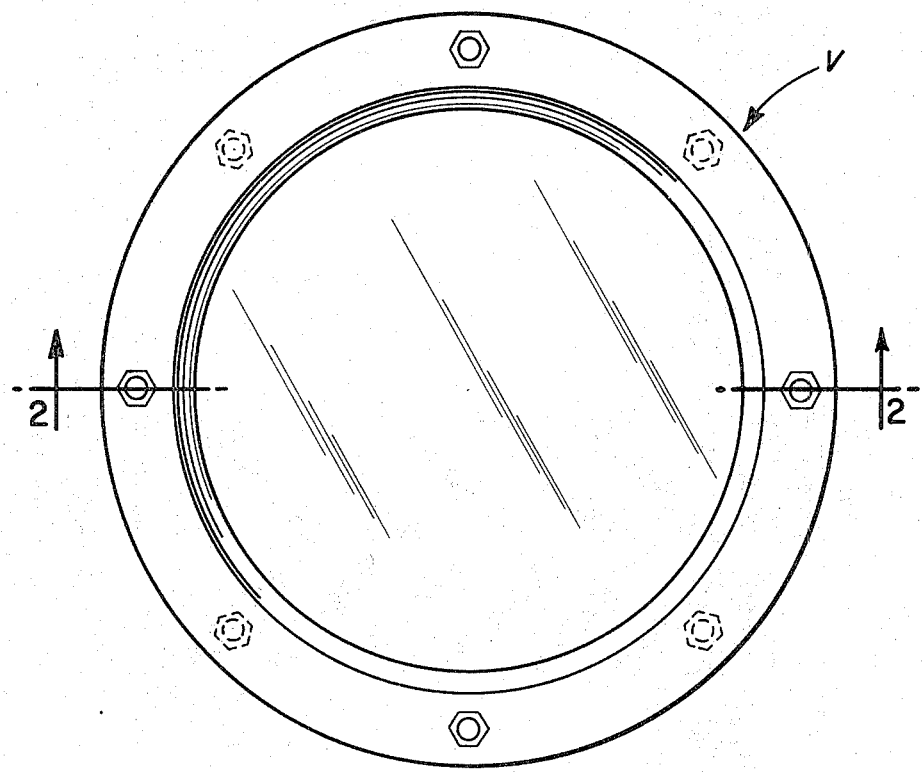
FIG. 1 is a front elevation of the viewport of the invention.
Figure 2:
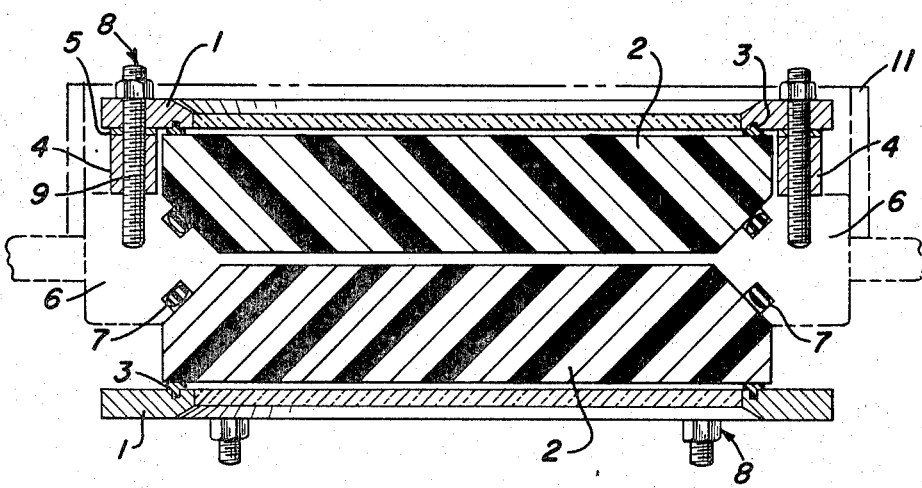
FIG. 2 is a section taken along the line 2—2 in FIG. 1.

Referring now to the drawings the viewport assembly is shown generally at V and comprises retaining rings 1 preferably made of steel. A pair of windows 2 preferably made of a transparent plastic material such as an acrylic resin, polycarbonate resin, or some other equivalent material are mounted in support members 6 and held in place by retaining rings 1 and spaced therefrom by cushion rings 3 which fit into a grooved channel in retaining rings 1. The windows 2 have a cylindrical section and tapered side surfaces. The tapered side surfaces mate with the tapered surface of support members 6. The particular geometry of the windows added structural strength thereto. O rings 7 are provided in support members 6 and provide for the pressure seal between the windows 2 and the members 6. Retaining rings 1 are fastened to support members 6 by nut and bolt members 8. Provided between the rings 1 and support members 6 surrounding the bolt 9 of nut and bolt members 8 are spacer elements 4, preferably made of steel. Between the spacer elements 4 and retaining rings 1 are provided a plurality of shims 5. The exact number of said shims is determined by the desired critical spacing between retaining rings 1 and the top surface of the windows 2. The external surface of the viewport V is provided with a protective ring 11 which acts to protect the viewport from unexpected impacts. The O ring material and the cushion ring material are selected such that the O ring material has a hardness greater than the hardness of the cushion ring.

In operation when the viewport V is subjected to external pressure the initial pressure seal is obtained by the O rings seating against the tapered side surfaces of the windows. As pressure increases the plastic material of the windows themselves being malleable acts as its own seal. However, because the atmospheric gas in the SDC is predominantly highly permeable helium the gas will become entrapped in the gap between the windows 2. Upon raising the SDC from the bottom, pressure on the internal window is maintained because the chamber pressure is maintained. Accordingly, the internal window will retain its seal. However, as the external pressure decreases the external window will be forced outwardly by the pressure of the entrapped gas in the air gap. This outward pressure will compress cushion ring 3 unseating the external window from member 6 and O ring 7 and relieving the trapped gas pressure. In some cases the internal pressure is reduced as the SDC is brought to the surface. In such case the window may relieve in the other direction.

Having described the invention with reference to a preferred embodiment it should be understood that modifications to the parts or the exact arrangement thereof relative to each other may be made without departing from the scope of the invention.

What is claimed is:
1. A dual pressure viewport for pressure vessels comprising;
   support members having tapered surfaces;
   a pair of retaining rings fastened to said support members by a nut and bolt arrangement;
   spacer elements mounted on said bolts between said support member and said retaining rings;
   a plurality of shims mounted on said bolt between said spacer elements and said retaining rings;
   a pair of cushion rings mounted in grooves provided in said retaining rings;
   a pair of window elements having a combination of cylindrical surfaces and tapered side surfaces mounted in said retaining rings and spaced therefrom by said cushion rings, the tapered side surfaces of said window elements seating against the tapered surfaces of said support members;

a plurality of O rings provided in the tapered surfaces of said support member for providing a pressure seal between said members and said window elements.

References Cited

UNITED STATES PATENTS

| | | | |
|---|---|---|---|
| 2,357,753 | 9/1944 | Matuszak | 52—616 |
| 2,377,863 | 6/1945 | Campbell | 52—616 |
| 2,482,770 | 9/1949 | Heineman | 52—616 |
| 2,913,780 | 11/1959 | Weisselberg | 52—476 |
| 3,238,574 | 3/1966 | Martin | 52—616 |

HENRY C. SUTHERLAND, Primary Examiner

U.S. Cl. X.R.

52—397, 616